UNITED STATES PATENT OFFICE.

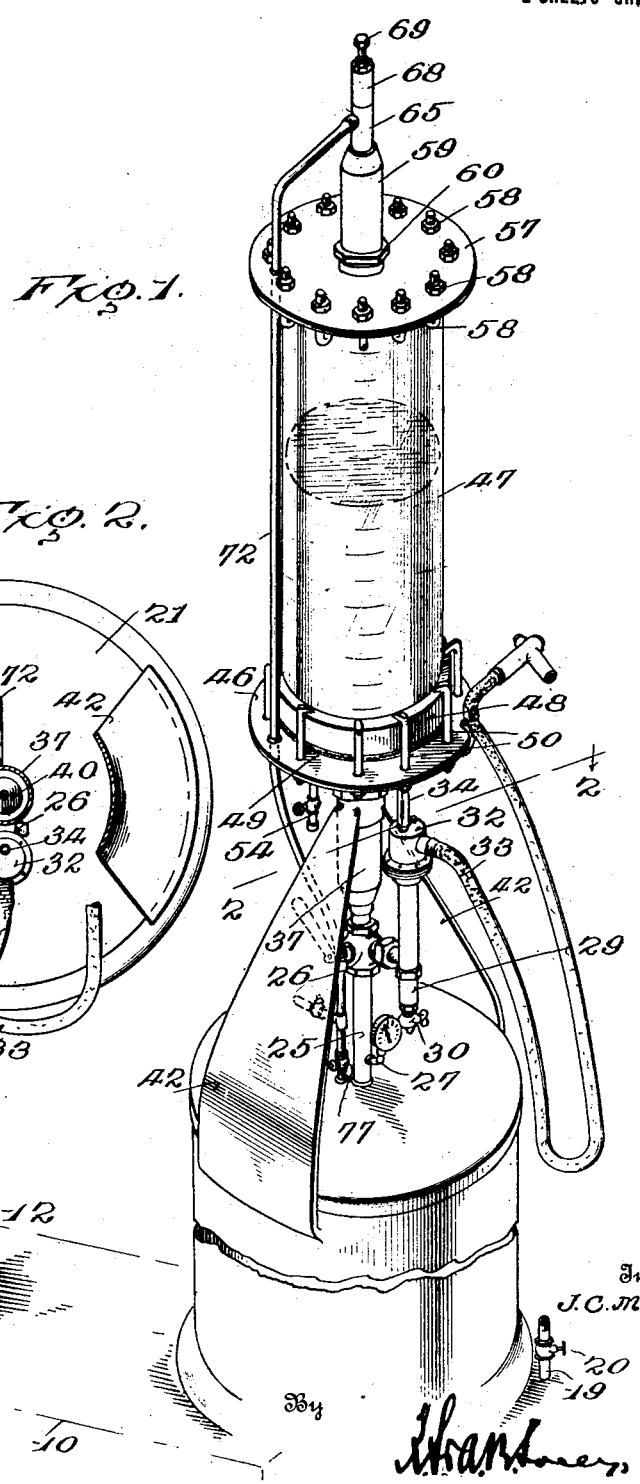

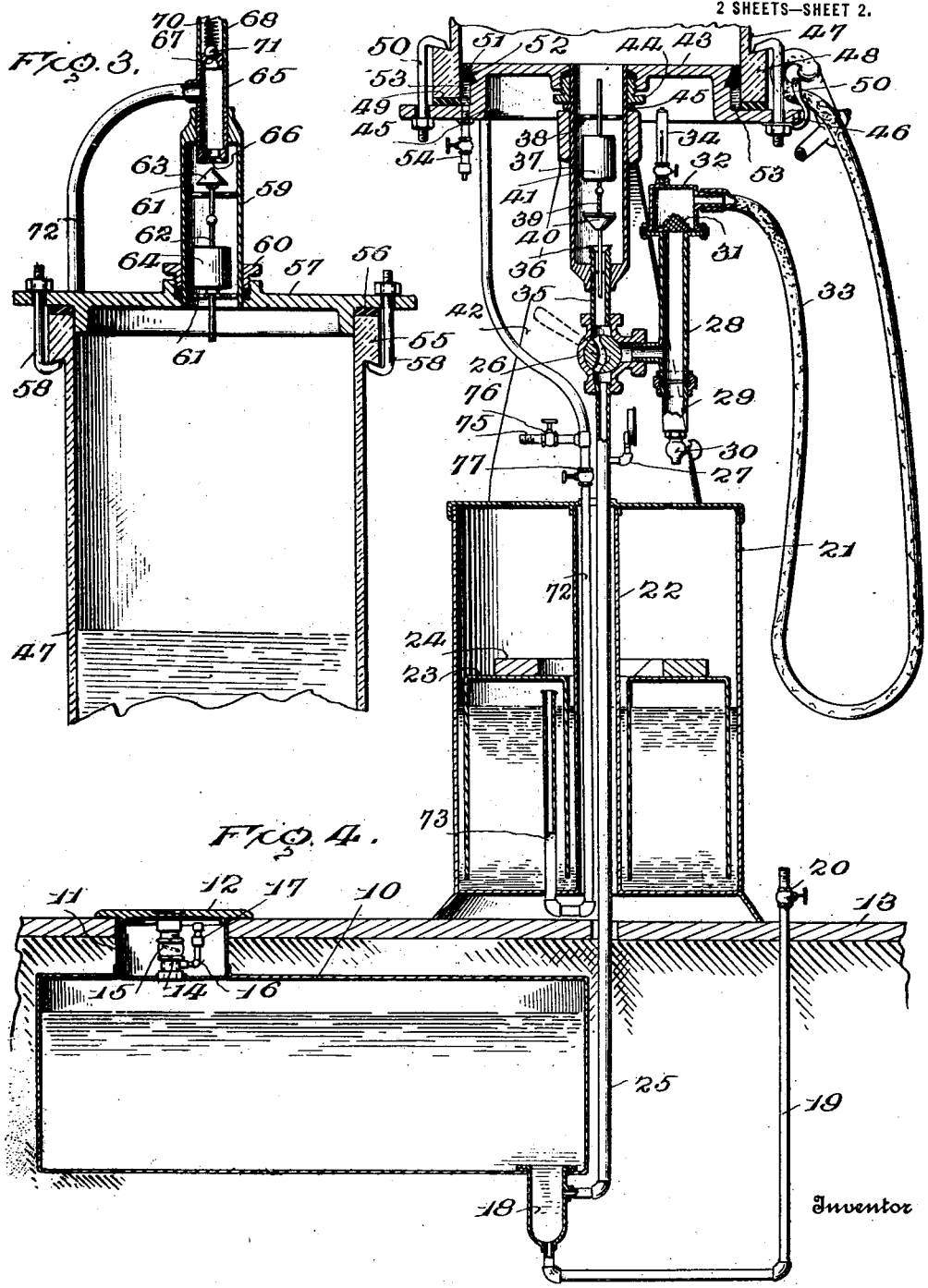

JOHN C. McKALLIP, OF HOUSTON, TEXAS.

GASOLENE-MEASURING DEVICE.

1,366,814.  Specification of Letters Patent.  Patented Jan. 25, 1921.

Application filed March 20, 1917, Serial No. 156,127. Renewed March 4, 1920. Serial No. 363,283.

*To all whom it may concern:*

Be it known that I, JOHN C. McKALLIP, a citizen of the United States, residing at Houston, in the county of Harris and State of Texas, have invented certain new and useful Improvements in Gasolene-Measuring Devices, of which the following is a specification.

This invention relates to an improved gasolene measure particularly designed for use at gasolene service stations and has as its primary object to provide a device of this character employing a transparent measuring vessel so that the consumer may be assured of receiving the amount of gasolene purchased and wherein the gasolene will, by air pressure, be forced into the measuring vessel from a storage tank and then out of the measuring vessel by air pressure from a pressure tank to be delivered to the consumer, thus making it unnecessary to manually handle the gasolene in the delivery thereof.

The invention has as a further object to provide an arrangement wherein the gasolene will be quickly delivered to the consumer so that a minimum of evaporation and waste will occur.

The invention has as a further object to provide a device of the above described character having a hydrometer associated therewith so that the consumer may be apprised of the quality of the gasolene.

And the invention has as a still further object to provide an improved mounting for the measuring vessel.

Other and incidental objects will appear as the description proceeds and in the drawings wherein I have illustrated the preferred embodiment of the invention and wherein similar reference characters designate corresponding parts throughout the several views.

Figure 1 is a fragmentary perspective view particularly showing the mounting of the measuring vessel of my improved device.

Fig. 2 is a transverse sectional view taken on the line 2—2 of Fig. 1.

Fig. 3 is a fragmentary vertical sectional view particularly showing the mounting of the closure plate at the upper end of the measuring vessel as well as the check and safety valves carried by the said plate, and Fig. 4 is a fragmentary sectional view particularly showing the mounting of the measuring vessel upon the supporting plate therefor as well as the construction and arrangement of the storage and pressure tanks employed.

In carrying out the invention, a gasolene storage tank 10 is employed. This tank is preferably buried in the ground, as now commonly practised, and is provided with an upstanding filling casing 11 closed by a plate 12, this plate being preferably arranged on a level with the floor which has been conventionally illustrated at 13. Upstanding from the tank within the casing 11 is a supply pipe 14 for the tank and arranged in the said supply pipe is a suitable check valve 15. Communicating with the supply pipe 14 below the valve 15 is an air supply pipe 16 in which is arranged a check valve 17. Projecting downwardly from one end of the tank 10 at the lower side thereof is a sump 18 and leading from the lower end of this sump is a drain pipe 19 carried up through the floor 13 and in which is interposed a shut-off valve 20.

Mounted upon the floor 13, at some suitable point adjacent the tank 10 is a pressure tank 21 having a pipe 22 extending therethrough and loosely surrounding said pipe within the tank is a pressure float or bell 23. Mounted upon the said bell are one or more weights 24, it being observed in this connection, that the tank 21 is closed, at its upper end, by a removable cover so that the weights 24 may be easily reached for removing one of the weights or adding additional weights.

Connected with the sump 18 of the tank 10 is a supply pipe 25 for the measuring vessel employed. This pipe is arranged to extend up though the floor 13 and through the pipe 22 in the pressure tank 21 and is provided, at its upper end, with a three-way valve 26. Communicating with the pipe 22 below the valve is a pressure gage 27 and connected to the lateral outlet of the valve is a discharge pipe 28 arranged substantially parallel to the supply pipe. Connected to the lower end of the discharge pipe, is a relatively short pipe section 29 providing a sediment chamber and leading from the said chamber is a drain cock 30 threaded into the lower end of the pipe section. The discharge pipe, at its upper extremity, is flanged to receive a preferably conical screen 31 and bearing over the said screen is a hollow cap 32 connected with the flange of the pipe 28 by bolts or other suitable fastening devices which also act to hold the screen 31 in position. Formed on the cap 32 is a suitable nipple to which is connected a discharge hose 33 of any approved design. The cap 32 is also preferably equipped with a hydrometer 34 for indicating the quality of the gasolene discharge through the said cap. The hydrometer may be of any conventional design. Fitted into the uppermost port of the valve 26 is a pipe section 35 formed, at its upper end, with a valve seat 36 and screw threaded upon the said pipe section is the casing 37 of a float valve. This casing, adjacent its upper end, is provided with a spider 38 and slidable through the said spider is the flexible stem 39 of a valve 40 arranged to coöperate with the valve seat 36. The lower end of the valve stem 39 is also preferably slidably received through a suitable spider in the pipe section 38. Mounted upon the valve stem above the valve 40 is a suitable float 41.

Extending upwardly from the pressure tank 21 to the valve casing 37 are oppositely disposed brace members 42 and removably fitted upon the upper end of the said casing is the supporting plate 43 for the measuring vessel having the valve casing fitted through a suitable packing gland 44 carried thereby. The plate 43 is offset to provide an annular shoulder 45 and extending from this shoulder is a radial flange 46. Mounted upon the said flange is a cylindrical measuring vessel 47 which is preferably transparent. Surrounding the lower end of the said vessel is an annular shoulder 48 and interposed between the said shoulder and the flange 46 is a gasket 49 which is preferably of soft rubber. Removably fitted through the flange 46 to engage the shoulder 48 of the measuring vessel is a plurality of hook bolts 50 adjustable to tightly clamp the measuring vessel against the gasket 49 for forming a sealed joint between the vessel and the said flange. In this connection, it is to be observed that the shoulder 48, at its upper edge, is preferably undercut to receive the hooks of the bolts 50 so that the said bolts may securely engage therewith. The shoulder 45 of the plate 43, upon its inner face, is undercut to provide an annular channel 51 and seated in the said channel is a preferably felt packing 52 bearing tightly between the shoulder 45 and the inner face of the vessel 47 to define a channel 53 between the vessel and the shoulder 45 below the said packing. The channel 53 is filled with water supplied through a pipe 54 opening into the said channel through the flange 46 of the said plate. Consequently, the packing 52 will always be kept moist or saturated by the water from within the channel 53. This packing will, therefore, provide an effectual sealing element between the plate 43 and the measuring vessel and being water soaked, will effectually overcome any tendency of the gasolene to seep through the said packing and find its way out of the gasket 49.

The measuring vessel 47, at its upper end, is provided with a shoulder 55 similar to the shoulder 48 at the lower end of the vessel and fitted upon the shoulder 55 is a gasket 56 receiving the cap plate 57 closing the upper end of the vessel. Loosely fitted through the plate 57 is a plurality of hook bolts 58 engaged with the undercut inner edge of the shoulder 55 and adjustable upon the plate for tightly clamping the plate in position. Fitted axially through the plate is an upstanding valve casing 59 received by a suitable packing gland 60 upon the plate. The casing 59 is formed with spaced spiders 61 and slidably mounted upon the said spiders is a flexible valve stem 62 which, at its upper end, is provided with a suitable check valve 63. Mounted upon the lower extremity of the said valve stem is a float 64 of approved design. Threaded into the upper extremity of the casing 59 is a pipe section 65 formed, at its lower end, with a valve seat 66 arranged to coöperate with the valve 63 and at its upper end, with a valve seat 67. Threaded upon the upper end of the pipe section 65 is a valve casing 68 through which is adjustable a plunger 69. Mounted within the said casing to engage, at one end, with the said plunger is a spring 70, the opposite end of which is engaged with a ball valve 71 arranged to coöperate with the seat 67. As will be clear, the spring 70 will thus act to normally hold the valve 71 against the valve seat 67 with the plunger 69 adjustable for tensioning the said spring. This valve 71 provides, as shall presently appear, an escapement or safety valve for the measuring vessel.

Extending through the pipe 22 in the pressure tank 21 is an air pipe 72 entering through the bottom of the pressure tank and providing a stand pipe 73 projecting upwardly within the said tank and opening into the bell 23. This air pipe, at its upper extremity, is preferably carried through the plates 43 and 57 of the measuring vessel and is connected with the pipe section 65 upon the valve casing 59 at the upper end of the measuring vessel. Communicating with the pipe 72 above the pressure tank 21, is a branch pipe 75. Mounted in the branch pipe 75 is a shut-off valve 76 and mounted in the pipe 72 below the branch pipe is a similar shut-off valve 77.

As will now be readily understood, the valve 26 is formed to establish communication between the supply pipe 25 and the pipe section 35 to the measuring vessel in one position of the said valve with the discharge pipe closed and in another position of the valve is formed to close the discharge pipe and establish communication between the pipe section 35 from the measuring vessel and the discharge pipe 28. Accordingly, with the valve 26 arranged to close the discharge pipe, the storage tank 10 is filled with gasolene through the supply pipe 14 when air is introduced into the storage tank through the air supply pipe 16. The air pressure within the tank 10 may be readily ascertained by consulting the gage 27 upon the pipe 25 and this pressure will be sufficient to force gasolene from the tank 10 up through the said pipe into the measuring vessel. Accordingly, when it is desired to measure off a quantity of gasolene, the valve 26 is operated to permit the gasolene to flow through the pipe 25 and up through the valve casing 37 into the measuring vessel, it being observed, in this connection, that the measuring vessel is provided with suitable graduations indicating the capacity of the measuring vessel in terms of gallons. Consequently, the consumer may, by observing the level of the gasolene within the measuring vessel, be assured of obtaining the full amount of gasolene purchased.

The flow of gasolene into the valve casing 37 will lift the valve 40, when the gasolene will rise within the measuring vessel to force the air therein down through the pipe 72 and into the bell 23 of the pressure tank. In this connection, it should be stated that the pressure tank 21 is partly filled with a suitable liquid in which the bell floats so that as the air from the measuring vessel enters the bell from the stand pipe 73, the bell will be raised within the pressure tank. The stand pipe 73, of course, projects above the level of the liquid in the pressure tank. When the measuring vessel becomes filled and the gasolene rises into the valve casing 59, the float 64 of the check valve 63 will then move the said check valve to engage the seat 66, and close the pipe section 65 communicating with the air pipe 72. Thus, the check valve 63 will prevent the flooding of the pressure tank 21 with the weights 24 upon the bell in the said tank holding the air within the bell under pressure tending to expel the air back out through the stand pipe 73 and into the measuring vessel and with the valve 71 acting as a safety valve for the measuring vessel. Therefore, when the valve 26 is operated to close the pipe 25, the pressure of the air within the bell 23 will, when the valve 26 is subsequently moved to establish communication between the pipe section 35 and the discharge pipe 28, expel the gasolene from within the measuring vessel out through the discharge pipe and through the screen 31 into the discharge hose 33 to the consumer. Any coarse impurities in the gasolene will, of course, be caught by the screen 31 and will be collected within the sediment chamber of the pipe section 29.

As will thus be seen repeated handling of the gasolene during its delivery to the consumer is eliminated and the tendency toward incidental loss of the gasolene is thus overcome. Moreover, since the gasolene is expelled from the measuring vessel by air pressure, the gasolene will be quickly delivered to the consumer so that the loss of gasolene through evaporation will be reduced to a minimum. So long as the gasolene stands within the valve casing 37 to support the float 41 of the check valve 40, this check valve will be held away from the valve seat 36 so that the gasolene may flow out through the pipe section 35. However, when the measuring vessel is emptied and the level of the gasolene falls within the valve casing 37, the valve 40 will move to engage the valve seat 46 and close the pipe section 35 so that air within the measuring vessel and the bell 23 of the pressure tank 21 cannot escape to reduce the air pressure within the vessel and the bell.

It will therefore be seen that I provide a particularly efficient arrangement for the purpose set forth. Upon the emptying of the measuring vessel 47, as just above described, the valve 26 may then again be operated to fill the measuring vessel from the tank 10 in the manner previously set forth. Normally the valve 76 in the branch pipe 75 will be closed while the valve 77 in the air pipe 72 will be open. However, should it be desired to remove one of the weights 24 in the pressure tank 21 or repair the pressure tank, the valve 77 may be closed when a pipe supplying compressed air can be connected to the branch pipe 75 and the valve 76 opened for supplying air pressure within the measuring vessel. Furthermore, it will be observed that coarse impurities in the gasolene within the storage tank 10 will collect within the sump 18. Consequently, by connecting a pipe supplying compressed air with the air supply pipe 16, the residue in the sump may, when the valve 26 is closed, be blown out through the pipe 19 by opening the valve 20 in the said pipe.

Having thus described the invention, what is claimed as new is:

1. A device of the character described including a storage tank, a pressure tank having a pressure bell arranged therein, a measuring vessel having communication with the storage tank and adapted to receive fluid forced into the said vessel by air pressure within the storage tank, an air pipe leading from the measuring vessel and opening into the pressure bell of the pressure tank, a discharge pipe for the measuring vessel, and manually operable means for controlling the flow of fluid from the storage tank into the measuring vessel and from the measuring vessel into said discharge pipe.

2. A device of the character described including a storage tank, a pressure tank having a pressure bell arranged therein, a measuring vessel communicating with the storage tank and adapted to receive fluid forced into the said vessel by air pressure within the storage tank, a pipe leading from the measuring vessel and opening into the pressure bell in the pressure tank, means communicating with said pipe for automatically closing the pipe upon the filling of the measuring vessel, a discharge pipe, means communicating with the discharge pipe for automatically closing the said pipe upon the emptying of the measuring vessel, and means for controlling the flow of fluid from the storage tank to the measuring vessel and from the measuring vessel to the said discharge pipe.

3. A device of the character described including a storage tank, a pressure tank having a pressure bell therein, a measuring vessel communicating with the storage tank and adapted to receive fluid forced into the said vessel by air pressure within the said tank, a pipe communicating with the measuring vessel and opening into the pressure bell of the said pressure tank, a float operated valve at the upper end of the measuring vessel for automatically closing the said pipe upon the filling of the measuring vessel, a discharge pipe, a float operated valve at the lower end of the measuring vessel for automatically closing the discharge pipe upon the emptying of the measuring vessel, and means manually operable for controlling the flow of fluid from the storage tank to the measuring vessel and from the measuring vessel to the said discharge pipe.

4. A device of the character described including a storage tank, a pressure tank having a pressure bell arranged therein, a measuring vessel, a valve casing at the lower end of said vessel, a pipe connected with said valve casing and communicating with the storage tank, the measuring vessel being adapted to receive fluid forced through the said pipe by air pressure within the said storage tank, a discharge pipe for the measuring vessel communicating with said valve casing, a float operated valve reciprocable in the said casing for automatically closing the said discharge pipe upon the emptying of the measuring vessel, a valve casing at the upper end of the measuring vessel, a pipe communicating with the said last mentioned valve casing and opening into the bell of the said pressure tank, a float operated valve reciprocable in the said last mentioned valve casing for closing the said last mentioned pipe upon the filling of the measuring vessel, and manually operable means for controlling the flow of fluid from the storage tank to the measuring vessel and from the measuring vessel to the said discharge pipe.

5. A device of the character described including a storage tank, a pressure tank having a pressure bell arranged therein, a measuring vessel communicating with the storage tank and adapted to receive fluid forced into the said vessel by air pressure within the storage tank, a pipe communicating with the measuring vessel and opening into the pressure bell of the said pressure tank, an escapement valve communicating with the said pipe and automatically operable to vent the measuring vessel, a discharge pipe for the measuring vessel, means automatically operable for closing the said first mentioned pipe upon the filling of the measuring vessel, means automatically operable for closing the discharge pipe upon the emptying of the measuring vessel, and manually operable means for controlling the flow of fluid from the storage tank to the measuring vessel and from the measuring vessel to the said discharge pipe.

6. A device of the character described including a storage tank, a measuring vessel connected with the storage tank for receiving fluid therefrom, a pressure tank connected with the measuring vessel, means for normally maintaining a constant air pressure within the measuring vessel, and manually operable means controlling the flow of fluid from the storage tank into the measuring vessel and from the measuring vessel to be discharged.

7. A device of the character described including a storage tank, a measuring vessel connected with the storage tank for receiving fluid therefrom, a pressure tank connected with the measuring vessel, means mounted to gravitate within the pressure tank for normally maintaining a constant air pressure within the measuring vessel, and manually operable means controlling the flow of fluid from the storage tank into the measuring vessel and from the measuring vessel to be discharged.

8. A device of the character described including a storage tank, a measuring vessel connected with the storage tank for receiving fluid therefrom, a pressure tank connected with the measuring vessel, means automatically operable for closing communication between the measuring vessel and the pressure tank upon the filling of the measuring vessel, manually operable means for emptying the measuring vessel, and means automatically operable for closing the discharge from the measuring vessel upon the emptying thereof.

9. A device of the character described including a storage tank, a measuring vessel connected with the storage tank for receiving fluid therefrom, a pressure tank connected with the measuring vessel, a float operated valve for closing communication between the measuring vessel and the pressure tank upon the filling of the measuring vessel, manually operable means for emptying the measuring vessel, and a float operated valve for closing the discharge from the measuring vessel upon the emptying thereof.

In testimony whereof I affix my signature.

JOHN C. McKALLIP. [L. S.]